US005473936A

United States Patent [19]

Sasakura et al.

[11] Patent Number: 5,473,936

[45] Date of Patent: Dec. 12, 1995

[54] THROTTLE FULL-CLOSURE DETECTING APPARATUS

[75] Inventors: Hachirou Sasakura, Inuyama; Yoshihiro Okuda, Kariya; Noboru Takagi, Toyota; Akito Onishi, Nagoya, all of Japan

[73] Assignees: Nippondenso Co., Ltd., Kariya; Toyota Jidosha Kabushiki Kaisha, Toyota, both of Japan

[21] Appl. No.: 124,536

[22] Filed: Sep. 22, 1993

[30] Foreign Application Priority Data

Sep. 30, 1992 [JP] Japan .................................... 4-262403

[51] Int. Cl.[6] .................................................. G01M 15/00

[52] U.S. Cl. .......................................... 73/118.1; 73/117.3

[58] Field of Search ................................ 73/118.1, 117.3

[56] References Cited

U.S. PATENT DOCUMENTS

| | | | |
|---|---|---|---|
| 4,157,699 | 6/1979 | Mori | 123/417 |
| 4,359,894 | 11/1982 | Ikeura et al. | 73/118.2 |
| 4,515,009 | 5/1985 | Hasegawa et al. | 73/118.1 |
| 4,581,924 | 4/1986 | Otobe et al. | 73/118.1 |
| 4,722,313 | 2/1988 | Kohler et al. | 123/494 |
| 4,951,206 | 8/1990 | Kyohzuka | 73/118.1 |
| 5,003,816 | 4/1991 | Furuyama | 73/117.3 |
| 5,127,263 | 7/1992 | Iizuka | 73/118.1 |
| 5,157,956 | 10/1992 | Isaji et al. | 73/118.1 |

FOREIGN PATENT DOCUMENTS

| | | |
|---|---|---|
| 53-105639 | 9/1978 | Japan . |
| 60-249630 | 12/1985 | Japan . |
| 61-145406 | 7/1986 | Japan . |
| 63-15467 | 4/1988 | Japan . |
| 245014 | 10/1990 | Japan . |

*Primary Examiner*—Richard Chilcot
*Assistant Examiner*—Eric S. McCall
*Attorney, Agent, or Firm*—Cushman, Darby & Cushman

[57] ABSTRACT

A throttle full-closure detecting apparatus for judging the full-closure state of a throttle valve uses the minimum value of a throttle sensor voltage so that the apparatus output is compensated for, in particular, a change in temperature. In a timer routine in the apparatus, first, the throttle sensor output is AD-converted and the thus AD-converted output is stored into a RAM and a general purpose register Ar. Next, a full-closure angle is stored in a compare register Cr and the contents of Ar and Cr are compared with each other so that when Cr>Ar, the AD-converted throttle value is stored as a full-closure angle and first storage updating is performed with the minimum throttle opening as the angle. Further, second updating for adding a specified value to the stored value of the full-closure angle is performed at a period sufficiently larger than the period of the time routine, and the first updating is made ready after the second updating.

6 Claims, 8 Drawing Sheets

THROTTLE FULL-CLOSURE DETECTING APPARATUS

BACKGROUND OF THE INVENTION

The present invention relates to an apparatus for detecting full-closure of a throttle, which is used, for example, in an electronic control system of a car internal combustion engine to obtain a reference to be used for detection of an idling state and for calculation of throttle opening information.

In an internal combustion engine, detection of the opening of a throttle valve is necessary for calculation of the quantity of fuel injection, the timing of ignition, etc. A throttle opening detecting mechanism is used for detecting the throttle opening.

FIG. 9 shows an example of the configuration of such a throttle opening detecting mechanism for detecting the operating state of a throttle valve. This mechanism has a throttle shaft 11 directly connected to the throttle valve provided in a suction pipe. The throttle shaft 11 is mounted so as to be rotatable relative to a housing 12 and is arranged to rotate with the operation of the throttle valve. Sliders 131 and 132 are fixed to the throttle shaft 11 while keeping a predetermined relative angle. A printed resistor 14 shaped like a circular arc is provided on a surface of the housing 12 facing the slider 131. Opposite ends of the resistor 14 are connected to a constant voltage source and a ground terminal respectively, so that a voltage corresponding to the contact position of the slider 131 contacting with the resistor 14, that is, a proportionally divided voltage corresponding to the opening position of the throttle valve, is outputted as a voltage corresponding to the opening of the throttle valve.

In the throttle opening detecting mechanism thus configured, a detection output voltage is minimized when the throttle valve comes into a fully-closed state. The minimum value of the detection output voltage is stored as a throttle full-closure position so that the opening of the throttle is detected on the basis of the voltage detected by the detecting mechanism by reference to the minimum voltage value corresponding to the throttle full-closure position.

In the throttle opening detecting mechanism thus configured, however, the constituent members of this mechanism have coefficients of linear expansion which are different from each other depending on the change of temperature in the state where the housing 12 holding the resistor 14, and the like, for detecting a divisional voltage is incorporated within a body of the suction pipe. Accordingly, a delicate voltage change occurs in spite of no change of the throttle opening. Accordingly, when, for example, the temperature rises in accordance with the operation of an internal combustion engine after the minimum value of the throttle opening is stored in a low temperature state at the time of starting-up, or the like, of the internal engine, the output voltage of the throttle opening detecting mechanism is shifted, for example, toward a larger value in the above-mentioned condition in which the throttle valve is fully closed.

In such a case, accordingly, if the opening of the throttle is judged by reference to the throttle full-closure voltage in a low temperature state, the voltage detected by the throttle opening detecting mechanism has a value which is larger than the full-closure voltage in a low temperature state in spite of the fact that the throttle valve is actually set to the full-closure position, so that the throttle valve is decided not to be in a fully closed state. That is, a decision is made that the idling is off in spite of the fully closed state of the throttle valve.

SUMMARY OF THE INVENTION

Upon such circumstances, an object of the present invention is to provide a throttle full-closure detecting apparatus in which the full-closure position of a throttle valve is detected and stored accurately while the influence of variations in linear expansion coefficient due to variations in assembling conditions as well as quality of material of a throttle opening detecting mechanism are minimized so as to detect the opening of the throttle continuously securely to thereby perform reliable electronic control of an internal combustion engine.

In the throttle full-closure detecting apparatus according to the present invention, the minimum value of a throttle voltage is detected on the basis of a detection signal from a throttle opening detecting means for generating a voltage signal in accordance with the opening of a throttle valve, a minimum value storage means detects and stores the minimum value of a throttle voltage. In the minimum value storage means, there are provided a first updating means for updating the minimum value of the throttle voltage stored in the storage means to a newly detected minimum value when the newly detected minimum value of the throttle voltage is smaller than the minimum value previously stored in the storage means, and a second updating means for updating the minimum value stored in the minimum value storage means to a value larger by a predetermined value whenever a predetermined time passes, wherein the fact that the throttle valve is in a full-closure position is recognized in the condition that the detection signal from the throttle opening detecting means is set as the minimum voltage value stored in the minimum value storage means.

In the throttle full-closure detecting apparatus having such a configuration as described above, whenever the minimum value of the detection voltage from the throttle opening detecting mechanism is updated by the first updating means, the minimum value is stored as information of a reference corresponding to the throttle full-closure position. Accordingly, a reference voltage corresponding to the updated throttle full-closure position is learned and set successively so that the throttle opening is always obtained accurately on the basis of the reference voltage. Further, because the second updating means updates the minimum value stored in the minimum value storage means to a value larger by a predetermined value, even in the case where the minimum voltage value at the time of the full closure of the throttle valve is increased in accordance with a factor such as the engine temperature, the voltage value stored in the minimum value storage means is set by the second updating means to a value larger than the minimum voltage value actually detected by the detecting mechanism. Accordingly, the voltage value stored in the minimum value storage means is securely rewritten to the newly detected minimum voltage value so that the full closure of the throttle is detected stably.

DESCRIPTION OF THE PREFERRED EMBODIMENT

Figure 1:
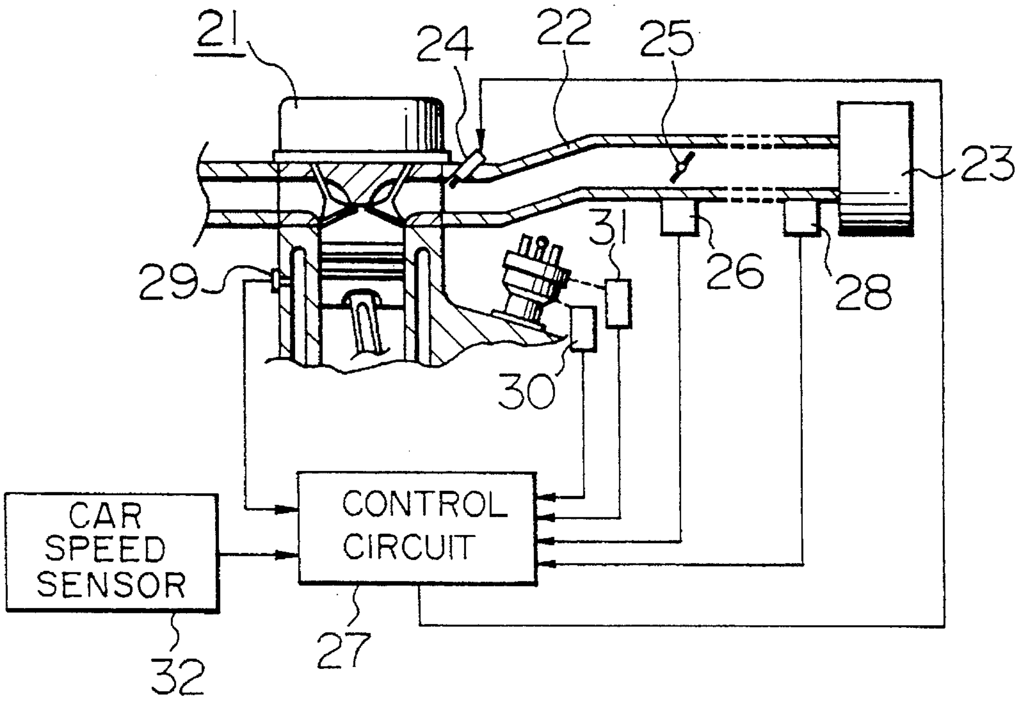
FIG. 1 is a configuration diagram for explaining an engine control system with the throttle opening detection according to an embodiment of the present invention.

An embodiment of the present invention will be described below with reference to the drawings. FIG. 1 shows a mechanism for controlling an engine 21 mounted on a car. Air taken in from an air filter 23 through a suction pipe 22 is supplied to respective cylinders of the engine 21. Fuel injected from a fuel injection valve 24 is supplied, together with the intake air, to the respective cylinders of the engine 21.

In this embodiment, the suction pipe 22 is provided with a throttle valve 25 which is driven in accordance with the quantity of depression of an accelerator pedal (not shown), so that intake air in an amount corresponding to the opening of the throttle valve 25 is supplied to the engine 21.

Figure 9:
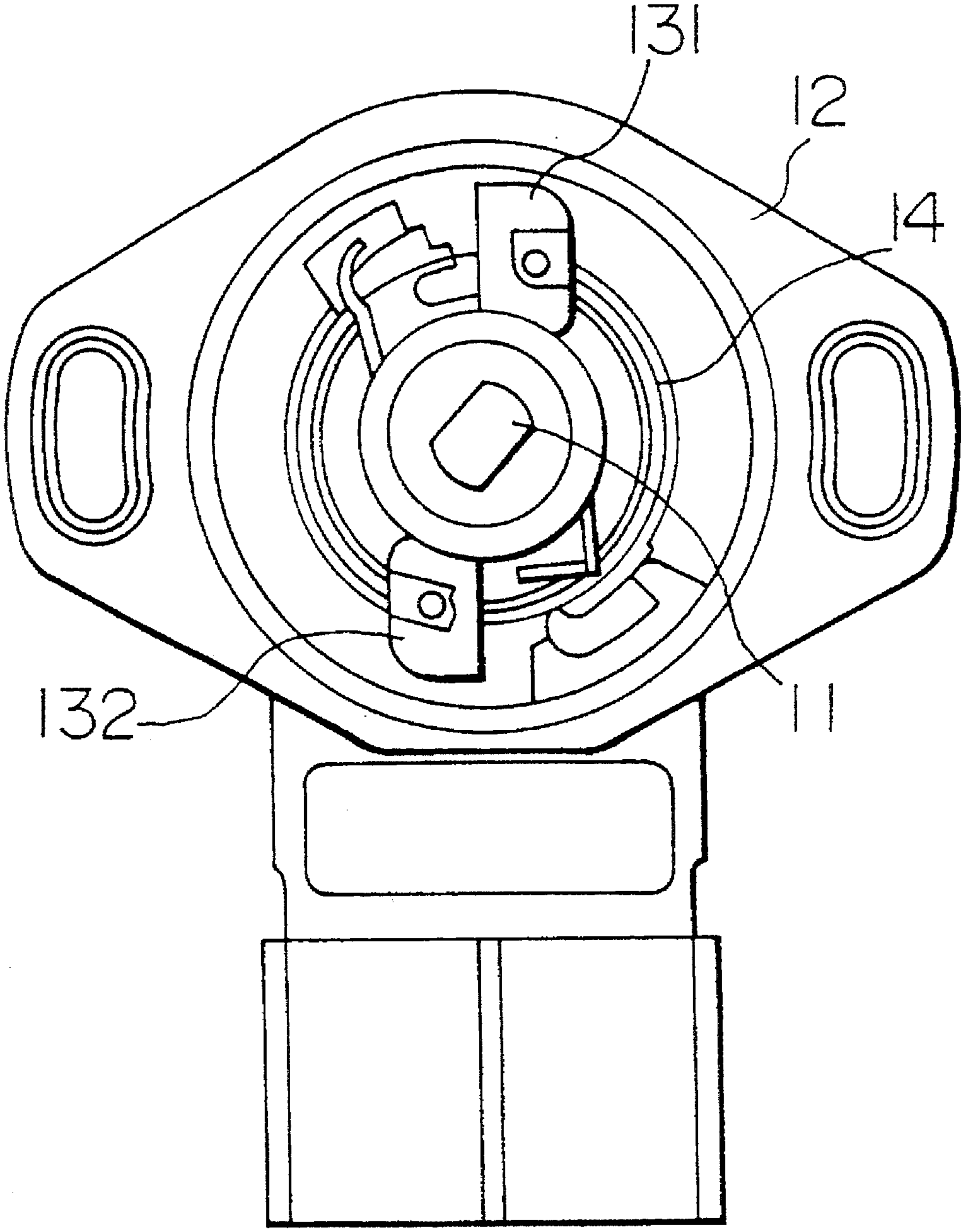
FIG. 9 PRIOR ART
FIG. 9 is a structural diagram for explaining a conventional throttle opening detecting mechanism.

The throttle valve 25 is provided with a throttle sensor 26 which is, for example, constituted as shown in FIG. 9 so that a voltage signal corresponding to the opening of the throttle valve 25 is supplied to a control circuit 27. The suction pipe 22 is provided with a suction air amount sensor 28 while the engine 21 is provided with a cooling water temperature sensor 29, a rotation sensor 30 and a cylinder discriminating sensor 31. Detection signals from these sensors 28 to 31 are supplied to the control circuit 27, and at the same time a car speed detection signal from a car speed sensor 32 is further suitably supplied to the control circuit 27.

The control circuit 27 judges the running condition of the engine 21 on the basis of these input signals, calculates the proper quantity of fuel injection in accordance with the running condition and controls the time for opening the fuel injection valve 24 in accordance with the quantity of fuel injection.

Figure 2:
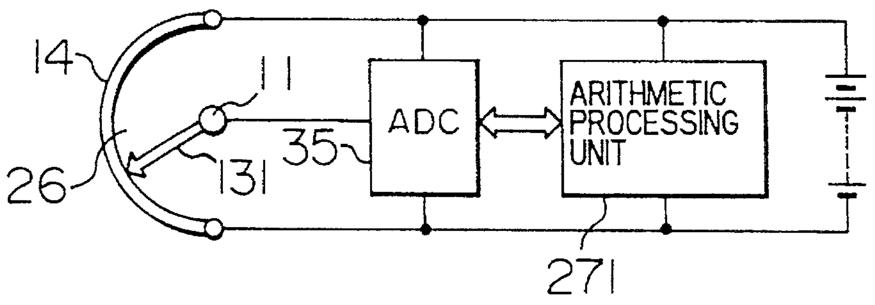
FIG. 2 is a diagram for explaining a circuit equivalent to a throttle opening detecting mechanism portion.

FIG. 2 shows a circuit equivalent to a throttle sensor 26 portion, for example, configured as shown in FIG. 9. In FIG. 2, a voltage signal obtained in accordance with the contact position of the slider 131 contacting with the resistor 14 is converted into digital data by an AD converter 35 and the thus converted digital data is supplied to an arithmetic processing unit 271 constituting a control circuit 27.

Figure 3:
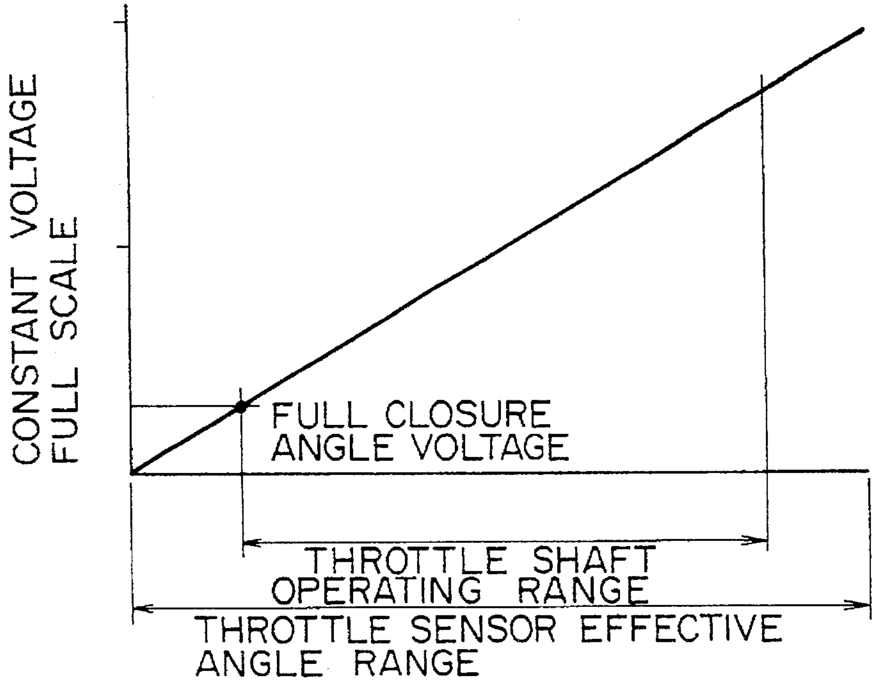
FIG. 3 is a graph for explaining the operating range of the throttle sensor.

FIG. 3 shows the output voltage characteristic of the throttle sensor 26 in accordance with the opening of the throttle valve 25. In FIG. 3, the effective angle range of the throttle sensor 26 is set to be larger than the operating angle range of the throttle shaft 11. While the percentage of the output voltage of the throttle sensor 26 to the whole output voltage at the full-closure angle of the throttle shaft 11 is adjusted to be at a predetermined value, the sensor 26 is mounted to a throttle body.

Figure 4:
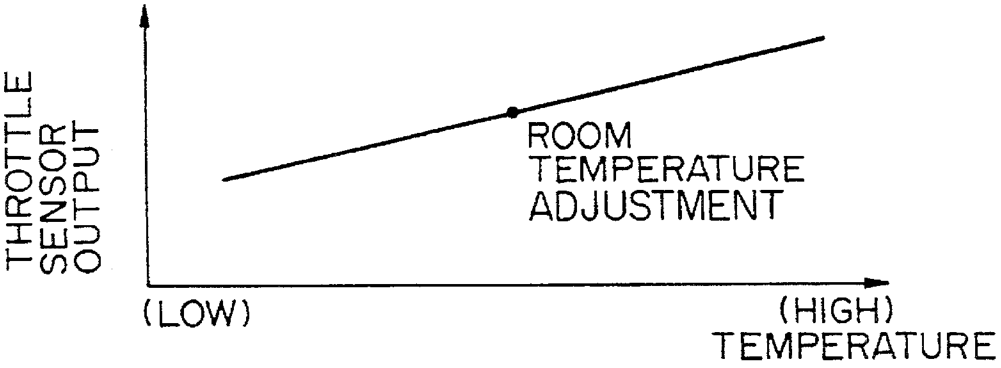
FIG. 4 is a graph for explaining the temperature characteristic of the throttle sensor.

FIG. 4 shows the output voltage characteristic of the throttle sensor 26 in the case where the temperature changes while the throttle shaft 11 of the throttle sensor 26 is kept in the full-closure angle position. In FIG. 4, the output voltage is shifted to an opening-side value. The amount of shift is dependent on the opening of the throttle shaft 11. The opening of shaft 11 is caused by positional displacement thereof due to a variation in the shape of or in the linear expansion coefficient of the sliders in the throttle sensor 26.

The control circuit 27 fetches the output voltage of the throttle sensor 26 after conversion into digital data whenever a predetermined period passes in accordance with the timer routine, so that the control circuit 27 can obtain the newest throttle opening information. The output voltage of the throttle sensor 26 is compared with the value stored in the minimum value storage means for storing the minimum voltage corresponding to the full-closure angle, so that the value stored in the minimum value storage means is updated to the newest minimum value given from the throttle sensor 26 only when the value stored in the minimum value storage means is smaller than the newest voltage value detected by the throttle sensor 26.

Whenever a predetermined period sufficiently larger than the AD conversion period corresponding to the reading out of data from the throttle sensor 26 as described above passes, a predetermined value is at once unconditionally added to the minimum value stored in the minimum value storage means to thereby update the opening-side value.

Because the temperature is low at the time of starting-up of the engine so that the output of the throttle sensor 26 exhibits a small value, the minimum value at this point of time is stored. When the temperature rises with the warming-up of the engine, the output of the throttle sensor 26 corresponding to the full-closure position is however increased. As a result, if the minimum voltage value in a low temperature state is considered as a reference value, a detection voltage larger than the stored minimum value will be outputted in spite of the fact that the entire closure of the throttle valve 25 is in a fully closed state so that a misjudgment is made as if the throttle valve 25 is slightly opened.

If the minimum value stored in the minimum value storage means is however updated to the throttle valve opening side at a slow time interval corresponding to the change of the temperature of the engine 21, the minimum value of the output voltage from the throttle sensor 26 after the warming-up of the engine 21 becomes smaller than the stored minimum value after the updating. Accordingly, the temperature characteristic shown in FIG. 4 is substantially canceled so that the output of the sensor 26 at the throttle full-closure angle coincides with the stored minimum value, and as a result, the full closure of the throttle can be detected securely.

Because the temperature increase of the cooling water of the engine 21 is considered to be substantially equivalent to the temperature increase of the throttle sensor 26, the sensor output at the throttle full-closure angle can be made to coincide with the stored value by updating the temperature characteristic error of the sensor output toward a value larger than the stored minimum value whenever the temperature of the cooling water changes by a predetermined value.

When the temperature rising of the engine 21 is stopped or even in the case where the slider of the sensor 26 is assembled reverse so that the temperature characteristic has a reverse slope, the frequency of updating to the minimum value is high because the updating is carried out whenever the AD conversion period passes. Accordingly, the value subjected to addition in the larger period is updated to the minimum value side soon.

Figure 5:
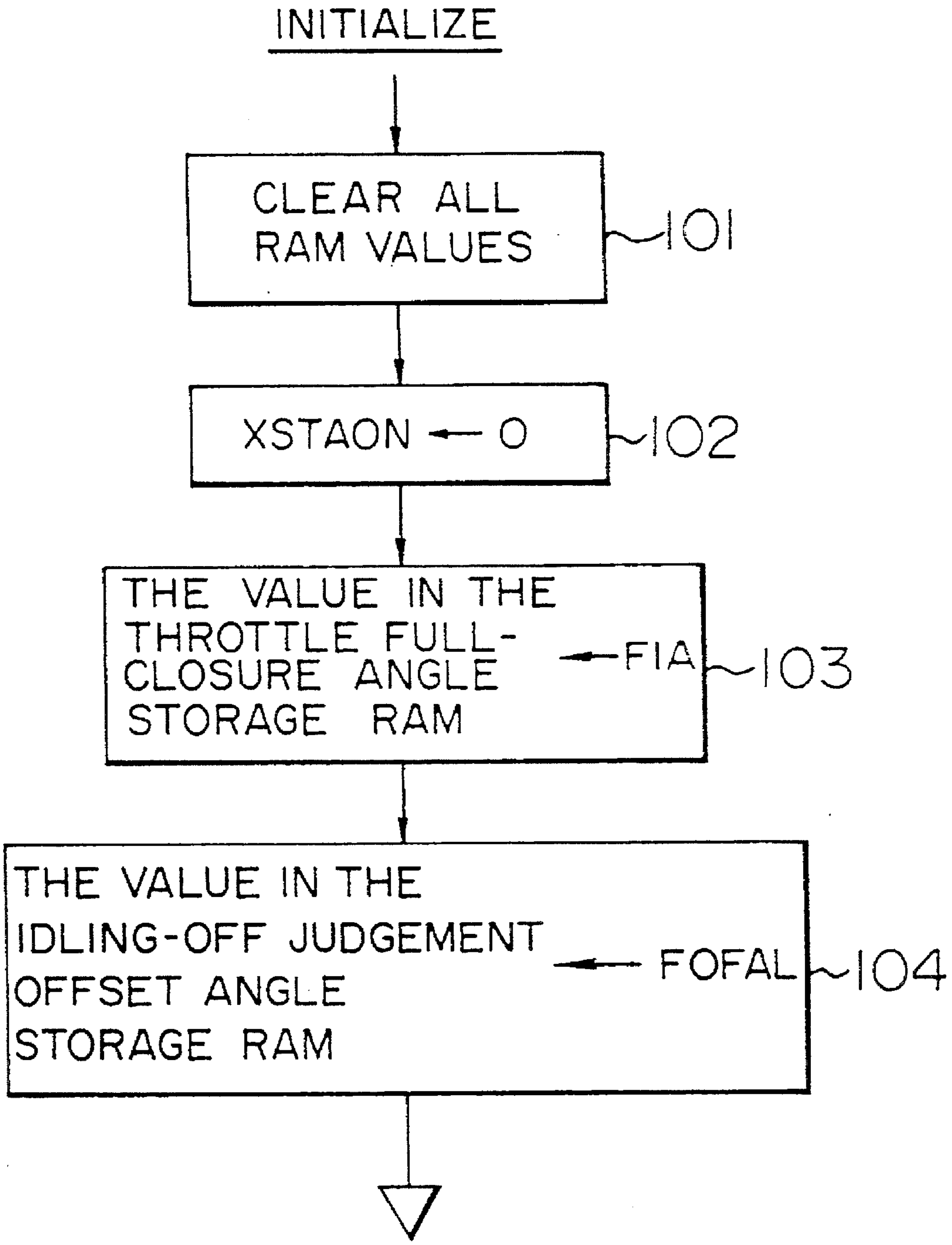
FIG. 5 is a flow chart for explaining an initializing routine in the throttle full-closure detection according to the present invention.

FIG. 5 shows an initializing routine which is executed in the control circuit 27. Because values stored in the RAM may become unstable at the time of turning-on of the electric source, in step 101, all the RAM values are cleared up or set to predetermined initial values. Then, in step 102, a starter-on history flag XSTAON is cleared up. Then, in step 103, the value in a throttle full-closure angle storage RAM is set to a fixed value FIA which is an initial value larger than the maximum value of full-closure angle tolerance. Then, in step 104, the value in an idling-off judgement offset angle storage RAM is set to a larger fixed value FOFASL of the idling-off discriminating angle.

That is, in this initializing routine, the value of the opening of the throttle for judging idling-off is initialized to a value larger than a normal one, so that misjudgment of idling-off is prevented from occurring in the case where an abnormal value is generated instantaneously because of noise at the time of starting-up of the engine or vibration sensed by the throttle sensor 26. When the engine turns to a normal running state, the minimum value is updated to an angle value obtained by adding a predetermined value to the normal full-closure angle storage value so that the full closure of the throttle can be judged.

Figure 6:
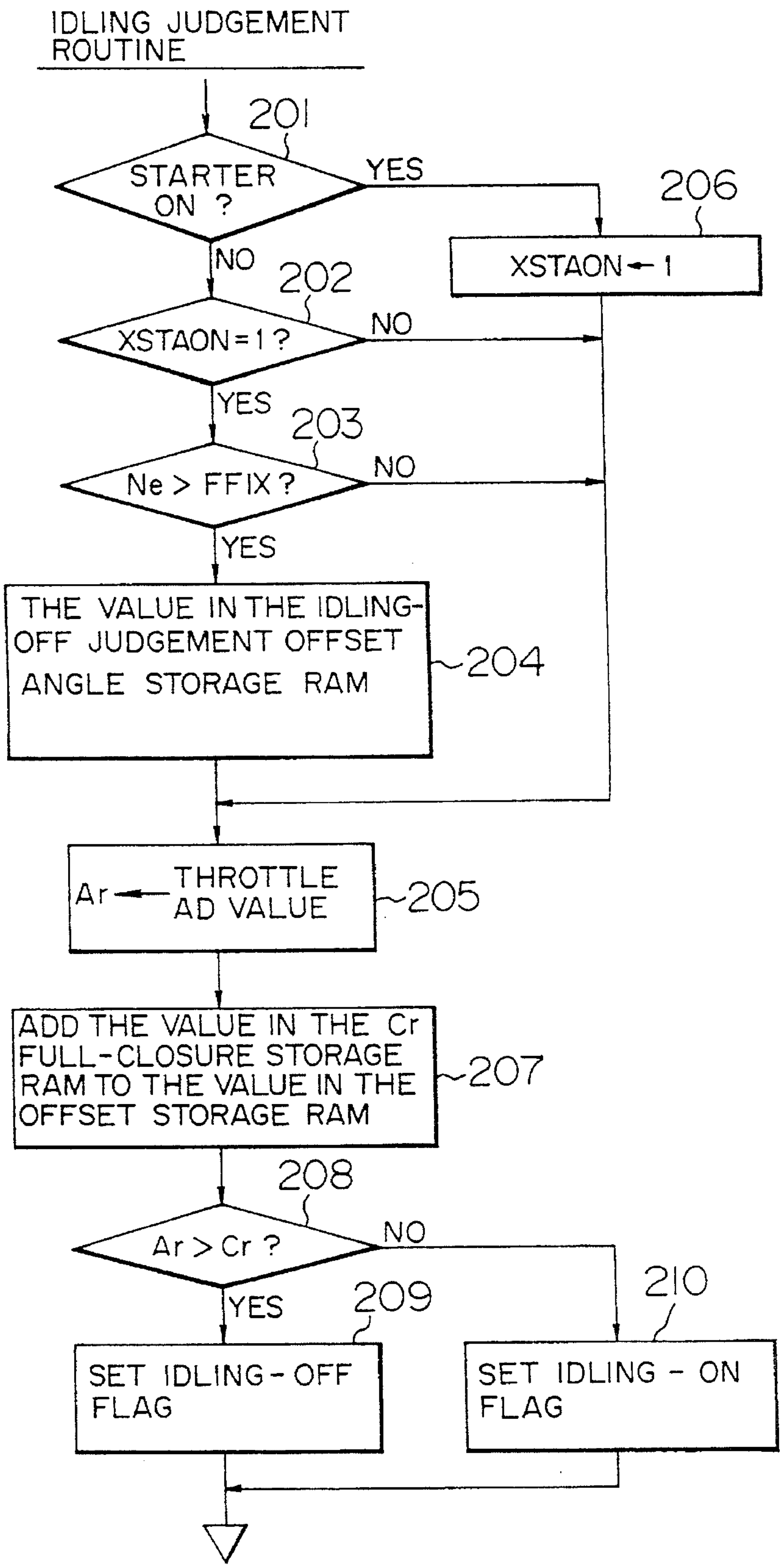
FIG. 6 is a flow chart for explaining an idling judgement routine in the throttle full-closure detection.

FIG. 6 shows an idling judgement routine. In step 201, a judgment is made as to whether the starter is turned on or not. When a decision is made that the starter is not turned on, a judgment is made in step 202 as to whether the history flag XSTAON which expresses the fact that the starter was turned on in the past is "1" or not. When a decision is made that the starter was turned on in the past, the situation of the routine goes to step 203. In the step 203, the current rotational speed Ne of the engine is compared with a set value FFIX. When a decision is made that Ne is larger than FFIX, the value of the idling-off judgement offset angle storage RAM is set to a smaller fixed value FOFAS of the idling-off judgement angle in step 204. Then, in step 205, the current detection value of the opening of the throttle valve 25 is set to a general purpose register Ar after AD conversion.

When starter-on is confirmed in the step 201, the execution of the routine goes to step 206 and the history flag XSTAON is set to "1" whereafter the execution of the routine goes to step 205. When a decision is made in the step 202 that XSTAON is "0" or when a decision is made in the step 203 that the rotational speed Ne is smaller than FFIX, the execution of the routine also goes to the step 205.

In step 207, a value obtained by adding the value stored in the offset storage RAM to the value stored in the full-closure storage RAM is set to a compare register, Cr. In step 208, the value of Ar is compared with the value of Cr. When a decision is made that Ar is larger than Cr, the situation of the routine goes to step 209 in which the idling-off flag is set. When a decision is made that Ar is smaller than Cr, the situation of the routine goes to step 210 in which the idling-on flag is set so that the idling state is judged.

Figure 7:
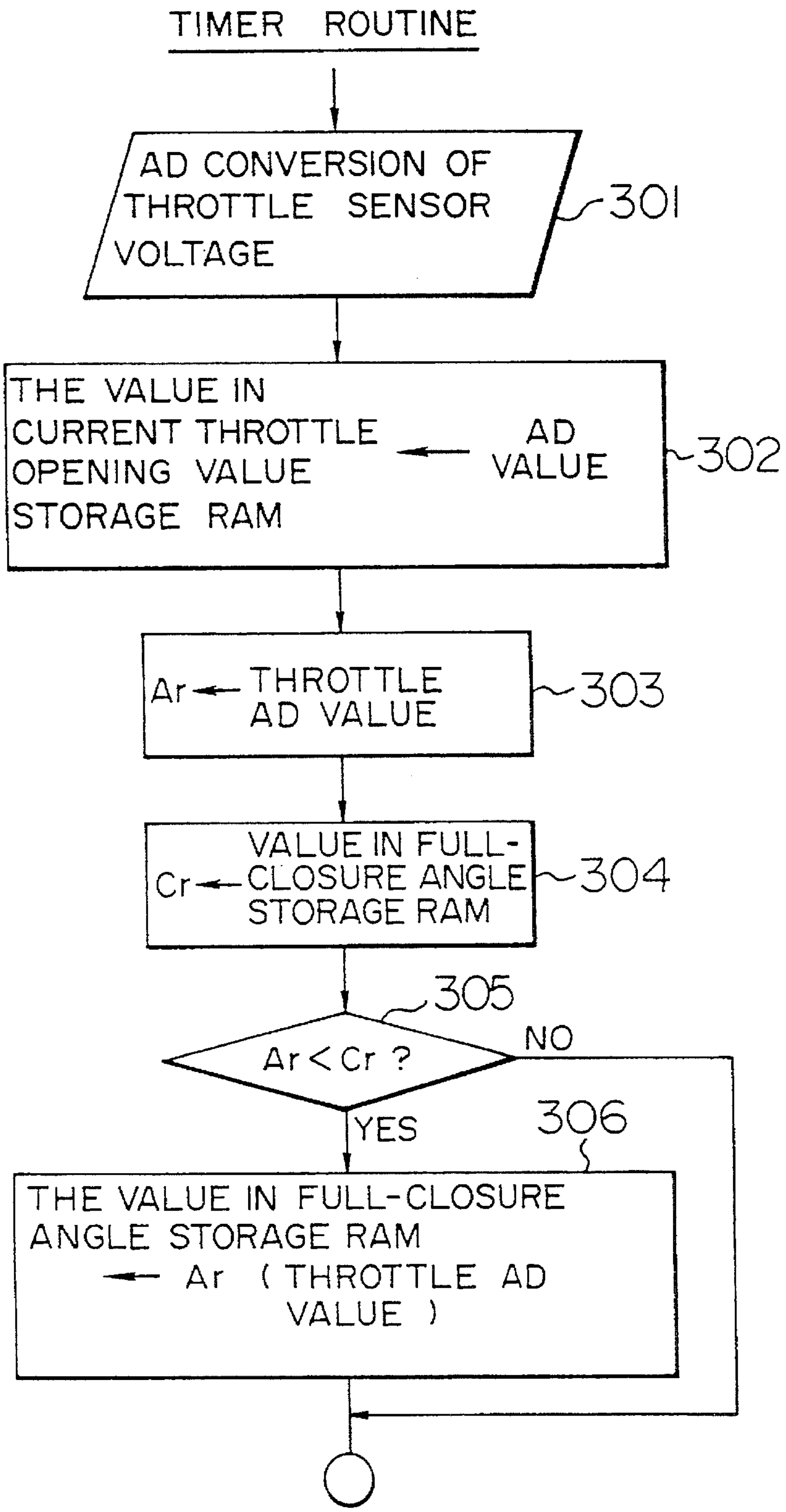
FIG. 7 is a flow chart for explaining a timer routine in the throttle full-closure detection.

FIG. 7 shows a timer routine which is, for example, carried out in accordance with the AD conversion period. In step 301, the output voltage of the throttle sensor 26 is AD-converted into digital data. In step 302, the value after the AD conversion is stored in the current throttle opening storage RAM.

In step 303, the AD value of the throttle sensor output is set to the general purpose register Ar. In step 304, the value of the full-closure angle storage RAM is set to the compare register Cr. In step 305, the value of Ar is compared with the value of Cr. When a decision is made that the AD value of the current throttle opening is smaller than the value of Cr, that is, when a decision is made that the AD value of the current throttle sensor output is smaller than the minimum value stored in the full-closure storage RAM, the situation of the routine goes to step 306 in which the AD value of the current throttle sensor output is stored, as the minimum value corresponding to the full closure, in the full-closure storage RAM to thereby perform the first updating of the minimum value.

Figure 8A:
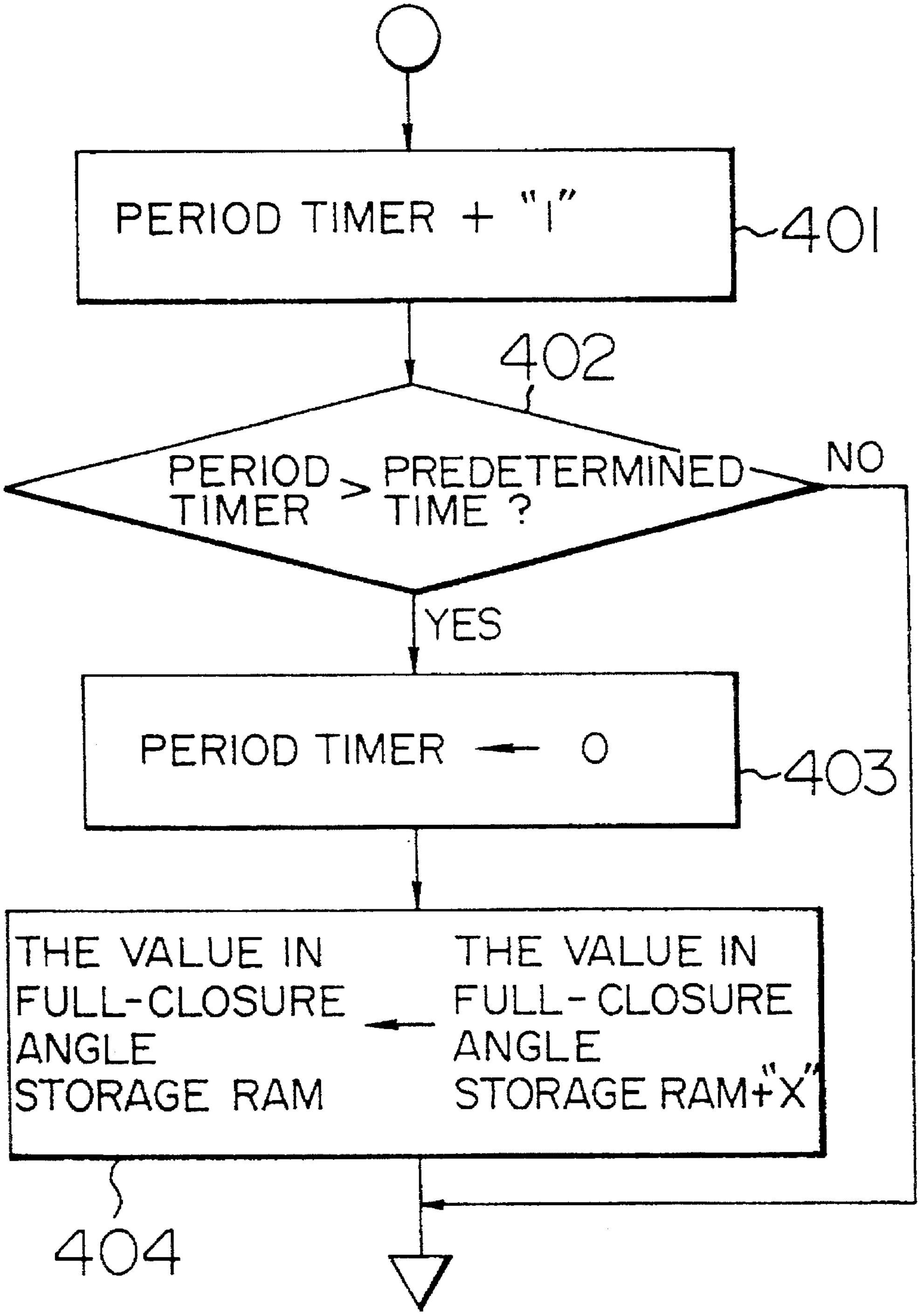
FIG. 8A is a flow chart for explaining a resetting routine for performing second updating.

Whenever the above-mentioned timer routine is carried out, "1" is added to the periodic timer in a step 401 shown in FIG. 8A. In a step 402, the value of the periodic timer is compared with a predetermined time corresponding to a period sufficiently larger than the period of the timer routine. When a decision is made that the value of the periodic timer exceeds the predetermined time, the periodic timer is cleared up in a step 403 and then a value obtained by adding a predetermined value "X" to the value stored in the full-closure angle storage RAM, that is, to the updated minimum value, is stored in the full-closure angle storage RAM to thereby perform the second updating in a step 404.

Figure 8B:
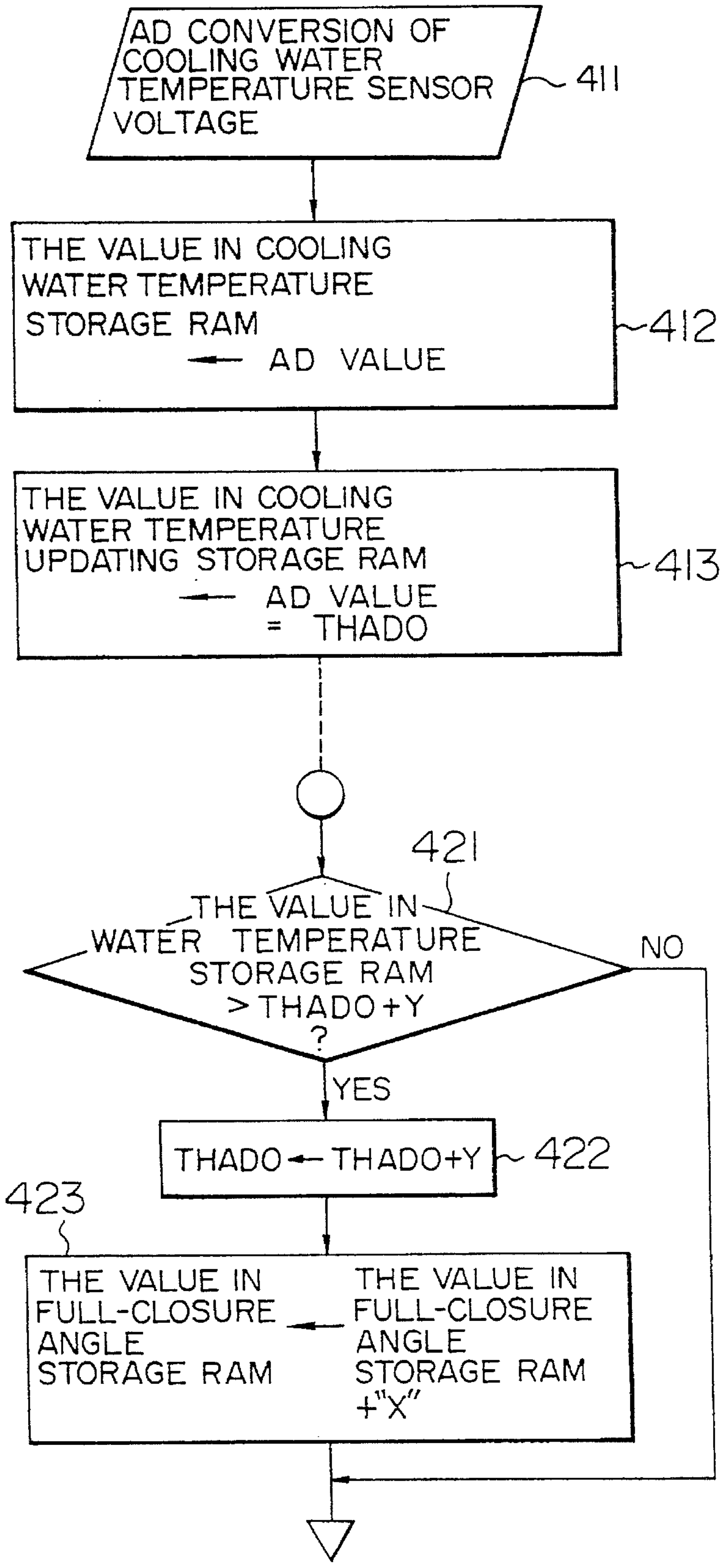
FIG. 8B is a flow chart for explaining a resetting routine for performing second updating on the basis of water temperature.

The present invention may be applied to a case where the second updating is performed on the basis of the temperature of water as described above. In this case, as shown in FIG. 8B, the output voltage from the water temperature sensor 29 is AD-converted into digital data in a step 411. In a step 412, the AD value is stored in the cooling water temperature storage RAM. In a step 413, the AD value is set to the cooling water temperature updating storage RAM.

Then, in a step 421, the value stored in the water temperature storage RAM is compared with a value obtained by adding a predetermined value Y to the value THADO stored at the time of the updating of the value in the water temperature RAM. When a decision is made that the value stored in the water temperature storage RAM is larger than the value after the addition, a value obtained by adding the predetermined value Y to the current value THADO is set as a new value THADO in step 422 and then the second updating means is carried out in step 423 to update the value of the full-closure angle storage RAM to a value obtained by adding the predetermined value X to the value stored in the full-closure angle storage RAM.

The above-mentioned embodiment shows the case where a sensor which generates a smaller voltage signal as the opening of the throttle decreases is used as the throttle sensor 26. In this way, the value of the full-closure storage RAM (the minimum opening value) is updated to the value of the output voltage of the throttle sensor 26 when the output voltage of the throttle sensor 26 is smaller than the value stored in the full-closure storage RAM. The present invention also may be used with a sensor 26 having a reversed connection polarity, i.e., one that generates a larger voltage signal as the opening of the throttle decreases. Using a sensor of this type, the RAM value is updated when the output voltage of the throttle sensor 26 is larger than the value stored in the RAM.

As described above, in the throttle full-closure detecting apparatus according to the present invention, the value of the full closure of the throttle is successively updated by updating and storing the minimum value of the signal detected by the throttle opening detecting mechanism, so that the entire closure of the throttle is detected with high accuracy. Accordingly, the opening of the throttle is calculated accurately with the throttle full-closure detection value as a reference. Further, because the throttle full-closure storage value is updated to a value larger by a predetermined value in accordance with a specified large period, for example, even in the case where the signal detected by the throttle detecting mechanism portion changes with the change of the temperature, the change value is canceled securely so that the minimum value updated to the newest full-closure value is stored successively. Accordingly, highly reliable throttle full-closure detection can be carried out, so that control such as fuel injection control in accordance with the detection of the opening of the throttle can be executed with high accuracy.

What is claimed is:

1. A throttle full-closure detecting apparatus comprising:

throttle opening detecting means for generating a signal corresponding to the opening of a throttle valve;

minimum opening value storage means for detecting and storing the minimum opening value of said throttle valve on the basis of said signal from said throttle opening detecting means;

first updating means for updating said value stored in said minimum opening value storage means to a newly detected minimum opening value when the newly detected minimum opening value of said throttle valve is smaller than the minimum opening value previously stored in said storage means; and second updating means for continuously updating the minimum opening value stored in said minimum opening value storage means to an opening value larger than said minimum opening value by adding a predetermined temperature compensation value at predetermined time intervals, whereby the fact that said throttle valve is in a full-closure position is recognized in the condition that the detection signal generated by said throttle opening detecting means is made to be the minimum opening value to be stored in said minimum opening value storage means.

2. A throttle full-closure detecting apparatus comprising:

throttle opening detecting means for generating a detection signal representing a throttle voltage corresponding to the opening of a throttle valve;

minimum value storage means for detecting and storing the minimum value of said throttle voltage on the basis of said detection signal generated by said throttle opening detecting means;

first updating means for updating said minimum value stored in said minimum value storage means to a new minimum value which is a newly detected voltage value of said throttle voltage when said newly detected voltage value is smaller than said minimum value stored in said minimum value storage means; and second updating means for continuously updating said minimum value stored in said minimum value storage means to a value larger than said minimum value stored in said minimum value by adding a predetermined temperature compensation value at predetermined time intervals, whereby the fact that said throttle valve is in a full= closure position is recognized in the condition that the detection signal generated by said throttle opening detecting means is made to be the minimum voltage value to be stored in said minimum value storage means.

3. A throttle full-closure detecting apparatus according to claim 1, wherein said predetermined time intervals for the execution of said second updating means are determined on the basis of a parameter concerning temperature rising in an internal combustion engine so that said minimum value is updated to a value larger by adding a predetermined value whenever the temperature of cooling water in said internal combustion engine changes by a predetermined value.

4. A throttle full-closure detecting apparatus according to claim 1, wherein before the minimum opening value of said throttle value to be stored is stabilized just after turning-on of a power source, the minimum opening value to be stored is set to a relatively large throttle opening value which is preliminarily set as an initial value of an idling-off angle judgement value; and the minimum opening value stored in said minimum opening value storage means after a predetermined running condition is once experienced is used as a opening value expressing the full closure position of the opening of the throttle valve.

5. A throttle full-closure detecting apparatus according to claim 2, wherein said predetermined time intervals for the execution of said second updating means are determined on the basis of a parameter concerning temperature rising in an interval combustion engine so that said minimum value is updated to a value larger by adding a predetermined value whenever the temperature of cooling water in said internal combustion engine changes by a predetermined value.

6. A throttle full-closure detecting apparatus according to claim 2, wherein before the minimum value of said throttle voltage to be stored is stabilized just after turning-on of a power source, the minimum value to be stored is set to a relatively large value which is preliminarily set as an initial value of an idling-off angle judgement value; and the minimum value stored in said minimum value storage means after a predetermined running condition is once experienced is used as a voltage value expressing the full closure position of the opening of the throttle valve.

* * * * *